UNITED STATES PATENT OFFICE.

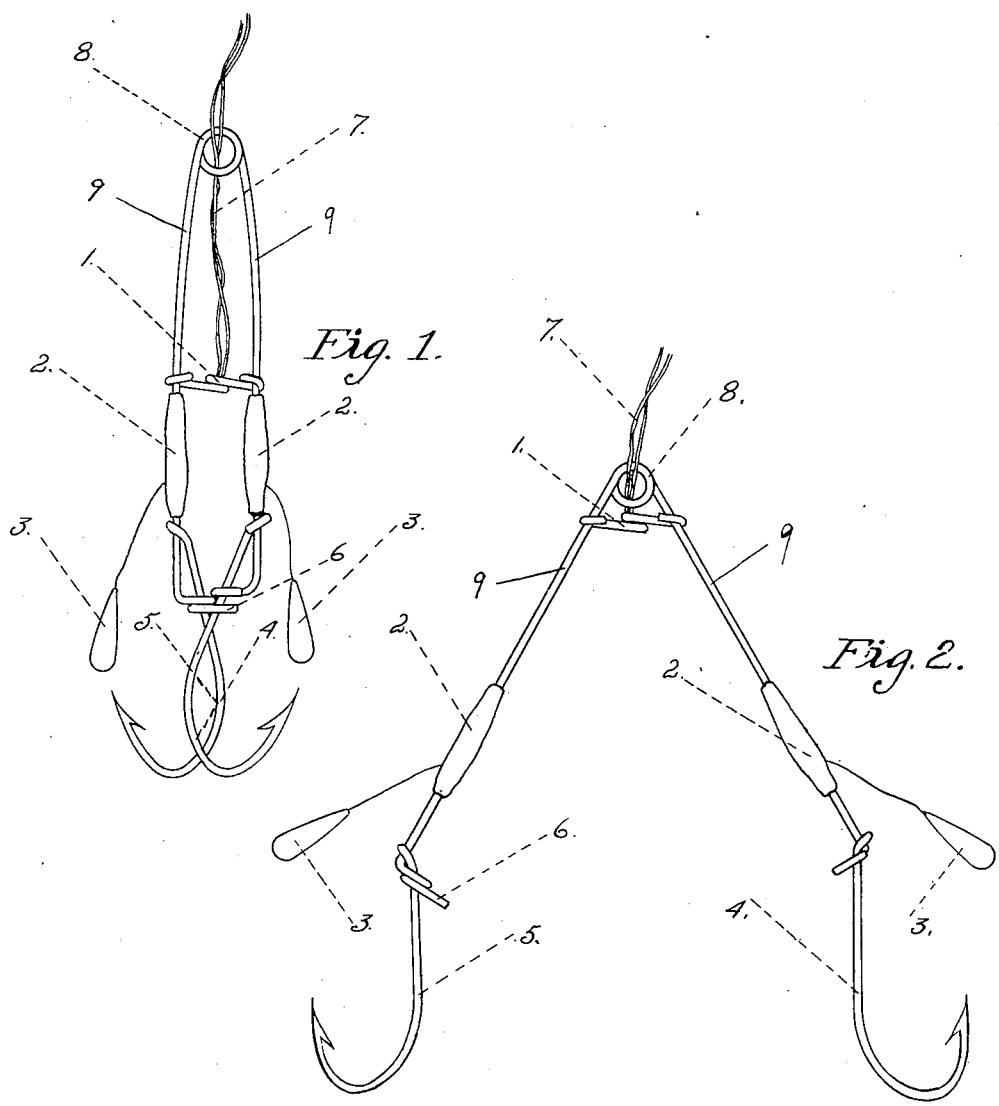

CLARENCE M. CURTIS, OF WOODSTOCK, ILLINOIS.

FISH-HOOK.

No. 825,639.     Specification of Letters Patent.     Patented July 10, 1906.

Application filed April 7, 1905. Serial No. 254,422.

*To all whom it may concern:*

Be it known that I, CLARENCE M. CURTIS, a citizen of the United States, residing at Woodstock, in the county of McHenry and State of Illinois, have invented a new and successful Fish-Hook, of which the following is a specification.

This invention relates to fish-hooks.

In twenty years experience in fishing for game fish I have ascertained the following: first, that a bait drawn on the top of the water is a better lure for a game fish than a bait that is below the top of the water; second, that a game fish does not always strike the bait from the same angle, but strikes from any and all angles or directions as soon as the bait is discovered; third, that in most localities game fish lie in among the thickest weeds.

It is therefore the object of my invention to provide a hook that will meet the above requirements.

Other and further objects will appear in the following description and will be more particularly pointed out in the appended claims.

Figure 1 is a side elevation of my invention in the position before it is struck by a fish. Fig. 2 is a like view after the device has been struck by the fish.

Referring more particularly to the drawings, 9 indicates a pair of spring-arms connected together at one end by an eye 8 and normally tending to spread apart. Each arm carries a hook 4 or 5, which is slidably mounted thereon to move in a direction approximately longitudinally of the spring-arm by which it is carried. For permitting this sliding movement on the arms each spring-arm has a portion bent into an eye in which the shank of a hook works, and each hook is bent to provide an eye in which a spring-arm works. The eyes on the spring-arm 9 are bent toward one another, so that the shanks of the hooks are at an angle to the spring-arms and are parallel to the line of pull when the spring-arms are expanded, thereby throwing the barbed points to the proper position to engage the walls of the mouth of the fish and at the same time causing the hooks when moving longitudinally to move inwardly away from weed guards or shields 3, secured to spring-arms 9. These shields or guards permit the device to pass among weeds and like objects without becoming entangled therewith, but are at the same time pliable enough to bare the points on being struck by the fish.

The means 2 for securing these guards to the spring-arms form stops for the hooks 4 and 5 and for the slide 1, which moves on the spring-arms between 2 and the eye 8, said slide controlling the position of the arms and having the line 7 connected thereto and passing through the eye 8, whereby the slide may be operated when the device is at any angle to the line.

To prevent the spring-arms being compressed together too much, one of the spring-arms carries a projection 6 and the hook on the other arm is, as shown in Fig. 1, placed against one side of this projection and against the opposite side of the hook on the arm carrying the projection 6.

In operation the bait is placed on one of the hooks 4 or 5 and the device adjusted as shown in Fig. 1. When the line is drawn through the water, the bait travels on the top of the water and the other hook is turned downward. Owing to the hooks 4 and 5 having barbs, should the fish strike only one hook and miss the other it could not escape.

Having thus described my invention, what I claim is—

1. The combination with an arm, of a weed shield or guard carried thereby, and a hook having its shank at an angle to the arm, and movable longitudinally thereof away from the shield or guard.

2. The combination with a pair of connected spring-arms, of a slide for controlling said arms, and a hook slidable longitudinally of each arm.

3. A fish-hook comprising a pair of spring-arms, an eye connecting an end of each of said arms, an eye formed at the other end of each of said arms, a pair of hooks each having its shank movable in one of the latter eyes and having a portion formed into an eye and moving on one of said arms, a weed shield or guard secured to the arms, and a slide for controlling the arms.

4. A fish-hook comprising a pair of spring-arms connected together, at one end of each of said arms, a slide for controlling the arms, a hook slidable longitudinally of each arm, and a weed shield or guard for each hook, one being carried by each arm.

5. A fish-hook comprising a pair of connected spring-arms, hooks slidable on the arms, a slide for controlling the arms, and stops between the slide and the hooks.

In testimony whereof I have signed my name to this specification in the presence of two witnesses.

CLARENCE M. CURTIS.

Witnesses:
 FRED B. BENNETT,
 FRANK R. JACKMAN.